United States Patent [19]
Nishigori

[11] Patent Number: 5,216,800
[45] Date of Patent: Jun. 8, 1993

[54] METHOD AND APPARATUS FOR ATTACHING A LID MEMBER OF AUTOMOBILE

[75] Inventor: Tetufumi Nishigori, Yamaguchi, Japan

[73] Assignee: Mazda Motor Corporation, Hiroshima, Japan

[21] Appl. No.: 688,148

[22] Filed: Apr. 22, 1991

[30] Foreign Application Priority Data

Apr. 28, 1990 [JP] Japan .................. 2-114170
Apr. 28, 1990 [JP] Japan .................. 2-114172
May 9, 1990 [JP] Japan .................. 2-120542

[51] Int. Cl.⁵ ............... B23P 19/04; B23Q 15/00
[52] U.S. Cl. .................. 29/712; 29/407; 29/430; 29/794; 414/225; 414/786
[58] Field of Search ........... 29/429, 430, 431, 407, 29/705, 711, 712, 791, 793, 794, 795, 823, 824; 198/572, 575; 414/222, 225, 750, 752, 786; 901/6, 7, 8, 43

[56] References Cited

U.S. PATENT DOCUMENTS

| 4,392,601 | 7/1983 | Fujikawa et al. | 29/430 X |
| 4,589,184 | 5/1986 | Asano et al. | 29/712 X |
| 4,667,866 | 5/1987 | Tobita et al. | 29/824 X |
| 4,736,515 | 4/1988 | Catena | 29/794 X |
| 5,079,822 | 1/1992 | Arai et al. | 29/430 |

FOREIGN PATENT DOCUMENTS

| 56-28826 | 3/1981 | Japan | 29/823 |
| 110581 | 5/1987 | Japan | 29/430 |
| 160970 | 7/1987 | Japan | 29/430 |

Primary Examiner—Joseph M. Gorski
Assistant Examiner—Peter Dungba Vo
Attorney, Agent, or Firm—Sixbey, Friedman, Leedom & Ferguson

[57] ABSTRACT

An apparatus for attaching a lid member of automobile comprising a lid member transferring device which transfers a lid member, in its closed posture, to an opening of car body, a lid member locating means which locates the specified one point part of a lid member being transferred by said lid member transferring device in such a state that said lid member is rotatable with said one point part as the center, a lid member checking device which checks the other part of a lid member rotating with said one point part as the center at the specified position and a lid member pressing device which presses a lid member so that said lid member rotates with said one point part as the center and said other part of said lid member is checked by said checking member.

9 Claims, 13 Drawing Sheets

METHOD AND APPARATUS FOR ATTACHING A LID MEMBER OF AUTOMOBILE

BACKGROUND OF THE INVENTION

This invention relates to a method and an apparatus for attaching a lid member of automobile, particularly, a method and an apparatus for attaching a lid member, such as a bonnet, a truck lid or the like, to the specified position of a car body.

Generally, a lid member such as a bonnet, a trunk lid or the like, is attached at a metal line process (where metal parts, such as doors, a front fender or the like are attached) to a car body which was assembled at a floor main process and a main body assembling process.

Usually, the lid member mentioned above is attached to the car body in the following way. The lid member is set manually, in its opened state, to the attaching position at an opening of the car body. Then, a hinge member fixed to the specified position of the lid member is located to a hinge attaching part of the car body and is fastened by bolts. However, since a lid member such as a bonnet is comparatively heavy in weight, attaching of it to the car body has been an intricate work.

For the purpose of automating the lid member attaching work, Japanese Utility Model Registration Application Laying Open Gazette No. 56-28826, for example, disclosed a lid member attaching apparatus provided with a stocker which stocks a plurality of lid members, a conveying device which takes out lid members one by one from said stocker and conveys each lid member to the specified position, a transferring and locating device which transfers a lid member carried to the specified position to the attaching position at an opening of the car body and sets it there and a fastening device which fastens a hinge member fixed beforehand to the car body to the located lid member.

Recently, for the purpose of automating the bonnet attaching work, Japanese Patent Application Laying Open Gazette No. 62-99272, for example, has disclosed a robot for attaching a bonnet, whereby the position of a hinge attaching part is detected accurately by measuring a datum point provided in the car body, on the basis of such detected data a bonnet held by an adsorption pad, for example, is transferred, in its opened state, to the specified position of the car body, and a hinge member is located to a hinge attaching part.

In the case of the above-mentioned robot for attaching a bonnet, since a bonnet is transferred, in its opened state, to the specified position of the car body, a hinge member to be fastened to the car body side is also held in an opened state by its own weight, namely, is held in a sitting posture in relation to the hinge attaching part of the car body and therefore the hinge member can easily be seated on the hinge attaching part by moving the bonnet downward, without the necessity of changing the hinge member to a sitting posture.

However, in the above robot for attaching a bonnet, since a bonnet is transferred, in its opened state, to the specified position of the car body, when the bonnet is put in a closed state after the hinge member was fastened by a bolt, the bonnet is not held at the proper position due to manufacturing errors of the hinge member and attaching errors of the hinge member in relation to the bonnet and the car body, namely, clearances between the bonnet and the right/left fender are not uniformed. This spoils external appearance of the automobile and causes such problem that the side of the bonnet interfers with the fender.

On the other hand, it can be taken into consideration to attach a bonnet, in its closed state, to the car body. For example, in the case where each of plural locating pins is inserted in a respective locating hole made in the bonnet for locating the bonnet in relation to the car body, for example, if it is tried to improve positional precision of the locating pin and the locating hole for the purpose of improving the bonnet attaching precision, bad insertion of the locating pin can be caused due to positional errors of the locating pins and positional errors of the locating holes.

SUMMARY OF THE INVENTION

The present invention has been made to solve the above-mentioned problems and has for its object to provide a method and an apparatus for attaching a lid member, in its closed state, to the car body, entirely free from a positional gap between the lid member and the car body.

In order to attain the above object, the apparatus for attaching a lid member of automobile according to the present invention is equipped with lid member transferring means to transfer a lid member, which is to be set in an opening of the car body, to said opening of the car body in its closed state, lid member locating means having a locating member which is movable to and away from the car body, is located to the specified position relative to the car body and locates the specified one point part of the lid member being transferred by said lid member transferring means in the state where the lid member is rotatable with said one point part as the center, lid member checking means having a checking member which is movable to and away from the car body, is located to the specified position relative to the car body and checks the other part of the lid member rotating with said one point part as the center at the specified position, and lid member pressing means which presses the lid member so that the lid member rotates with said one point part as the center and said other part of the lid member is checked by said check member.

BRIEF DESCRIPTION OF THE DRAWINGS

The nature and advantages of the present invention will be understood more clearly from the following description of the present invention made with reference to the accompanying drawings, in which.

DETAILED DESCRIPTION OF THE DRAWING

Embodiments of the present invention are described below on the basis of the accompanying drawings.

Figure 1:
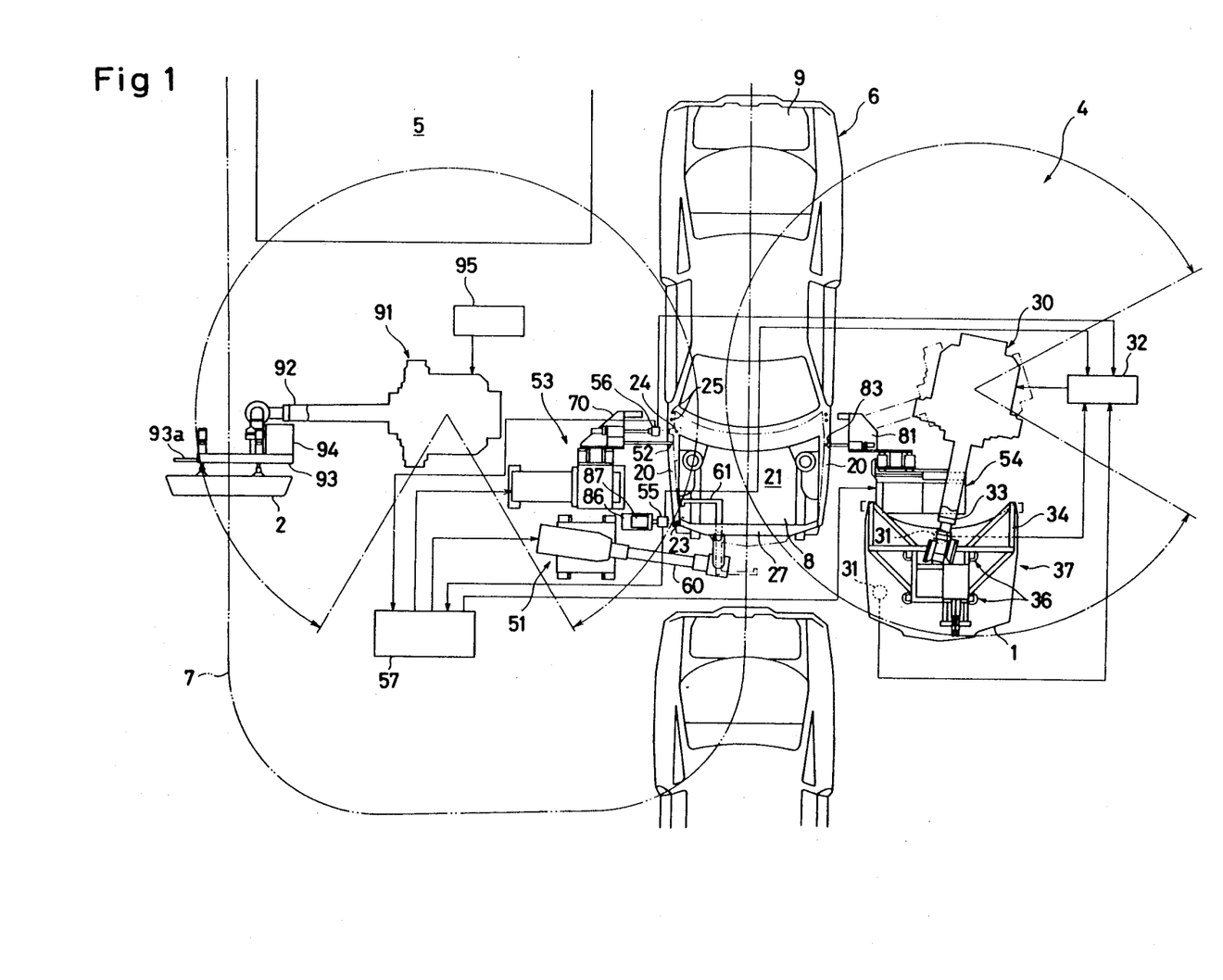
FIG. 1 is a plan view of a bonnet attaching apparatus according to one embodiment of the present invention.
Figure 2:
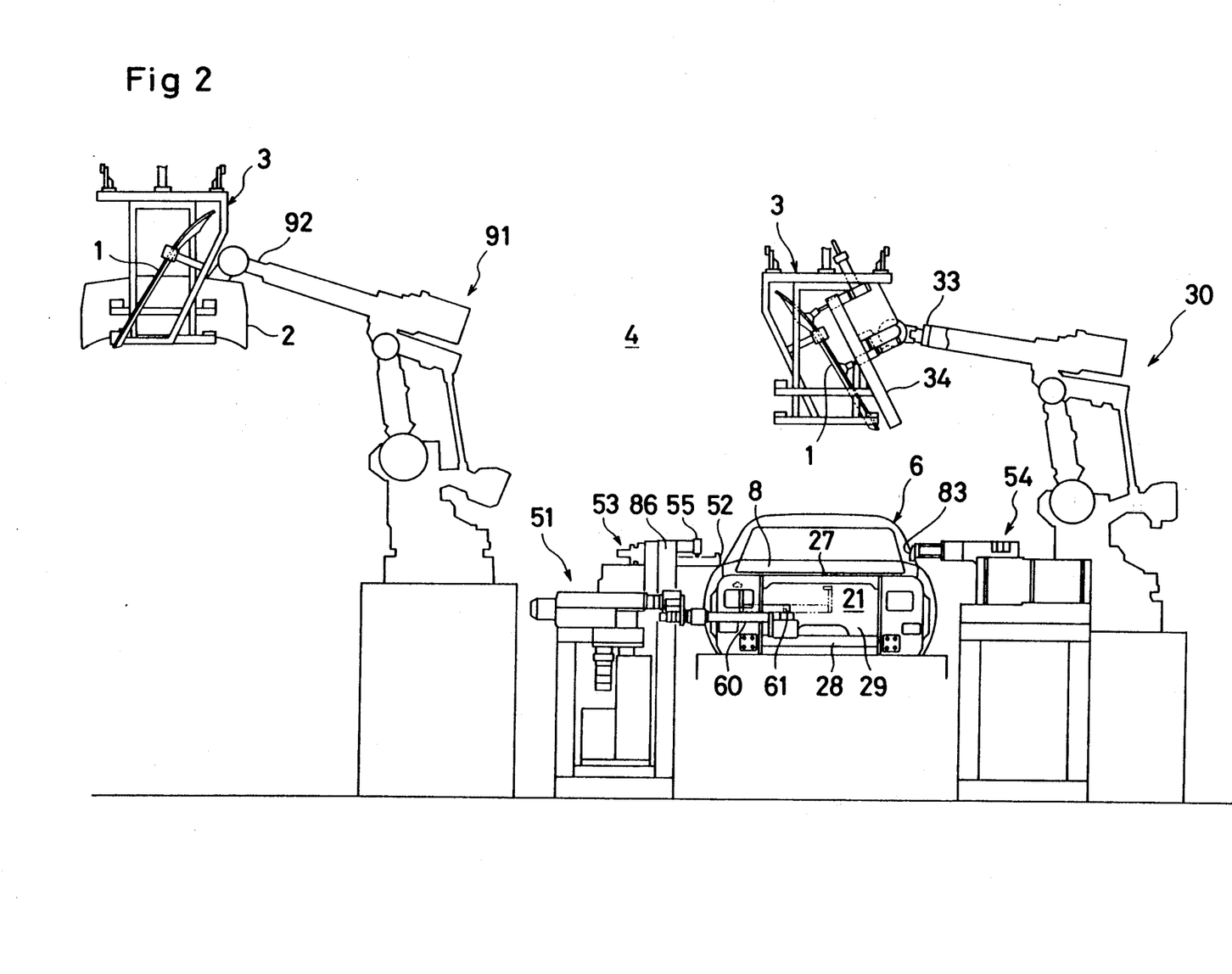
FIG. 2 is a front view of the bonnet attaching apparatus shown in FIG. 1.

As shown in FIG. 1 and FIG. 2, a bonnet 1 and a trunk lid 2 (as lid members) are conveyed as they are hung by a hanger 3 to an attaching station 4 along a conveying rail 7 and are attached by a lid member attaching apparatus provided at the attaching station 4 to a car body 6 which was also conveyed to the attaching station 4 by a shuttle conveyor (not shown in the drawing). In the following explanation, front, rear, right and left directions are defined on the basis of the front part, the rear part, the right part and left part of the car body.

The lid member attaching apparatus mentioned above is equipped with a bonnet attaching device which transfers, locates and attaches the bonnet 1 to a first opening 8 at the front part of the car body 6 and a trunk lid transferring device which transfers the trunk lid 2 to the specified position of an assembling station 5 which is in the rightward rear of the attaching station 4.

Before making an explanation about the above bonnet attaching device and the trunk lid transferring device, a brief explanation is made about the bonnet 1 and the car body 6.

Figure 3:
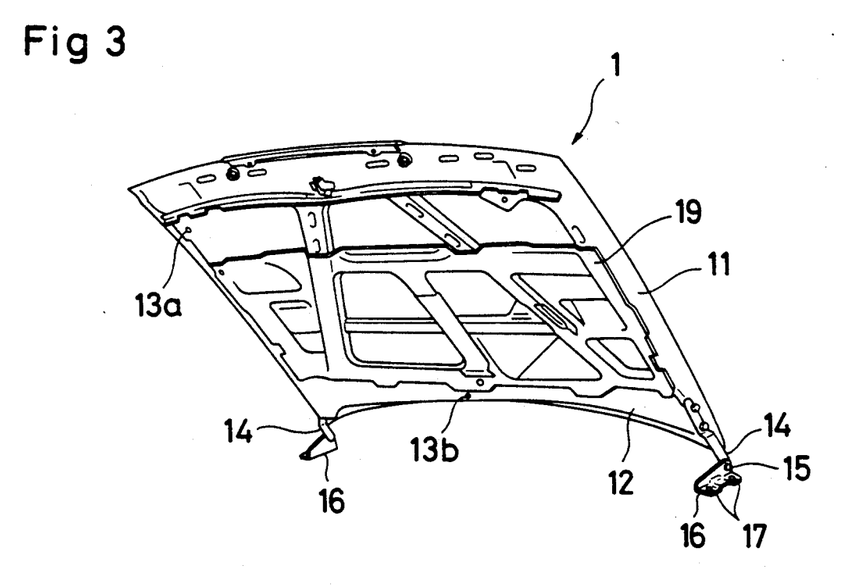
FIG. 3 is a perspective view of the bonnet.
Figure 4:
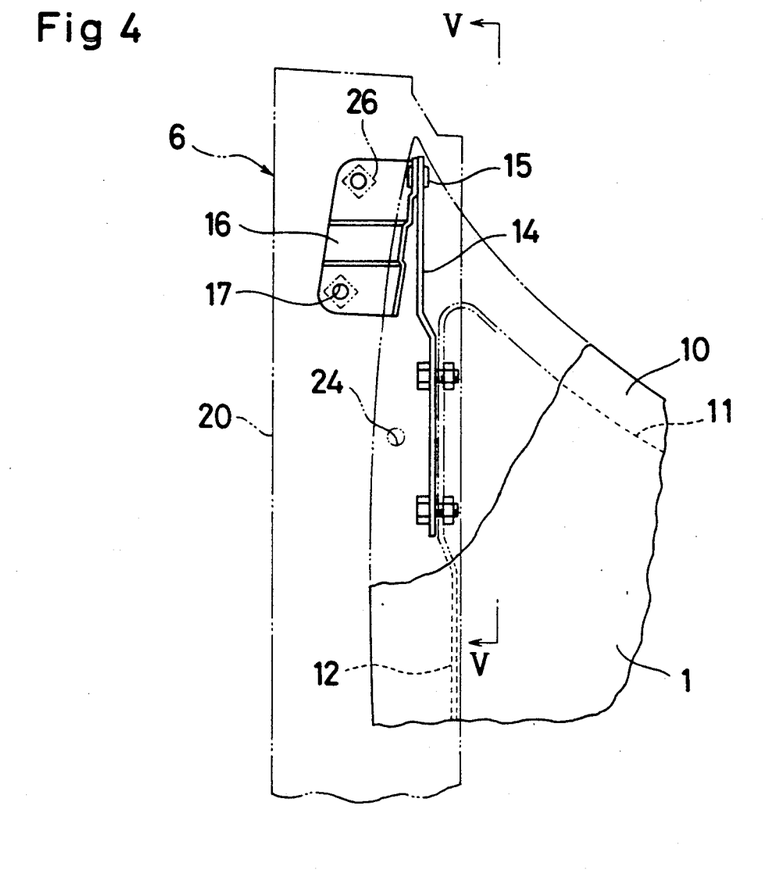
FIG. 4 is a plan view of a main part of the bonnet.
Figure 5:
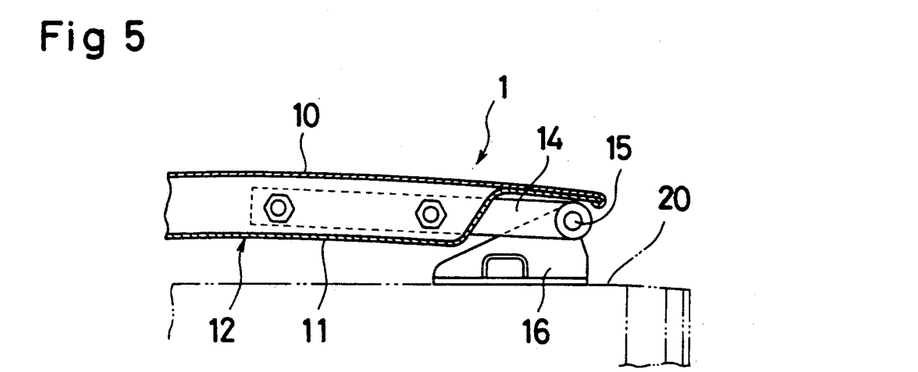
FIG. 5 is a cross section, taken along the V—V line in FIG. 4.

As shown in FIG. 3 through FIG. 5, the bonnet 1 is basically composed of an outer panel 10, an inner panel 11 and a reinforcing panel 19. A reinforcing frame 12 of closed section is formed at a lower part of the bonnet 1 by both panels 10, 11. The inner panel 11 has a pair of standard holes 13a, 13b. A pair of hinge members 14 (right and left) on the bonnet side is fixed to the side wall part of the reinforcing frame 12 at a rear end portion of the bonnet 1. A hinge member 16 on the car body side is provided rotatably at a rear end portion of the hinge member on the bonnet side through the medium of a hinge pin 15. The hinge member 16 on the car body side projects outwardly from the outer panel 10 and has a pair of bolt holes 17 (front and rear), through which a bolt is put.

Referring back to FIG. 1 and FIG. 2, a pair of front fender aprons 20 (right and left) extending in longitudinal direction of the car body is provided at the front part of the car body 6. Formed between a pair of the front fender aprons 20 is an engine room 21. Provided at an upper wall part of the front fender apron 20 on the right side of the car body are standard holes 23, 24 corresponding to both end portions in longitudinal direction of the engine room 21. Provided at a rear end portion of the upper wall part of the right and left front fender aprons 20 is a pair of hinge attaching holes 25 (front and rear). Fixed to a lower end surface of the upper wall part of the front fender apron 20 corresponding to each hinge attaching hole 25 is a nut 26 (refer to FIG. 4). Formed between a radiator support 27 and a front cross member 28 at the front end portion of the car body 6 is a front side opening 29 connecting to the engine room 21.

The bonnet attaching device mentioned above basically comprises a transferring device which puts the bonnet 1 taken out from the hanger 3 in a closed state to correspond to the first opening 8, transfers the bonnet 1 to a posture changing device which is slightly above the level of an upper end portion of the front fender apron 20 and then transfers the bonnet 1 to the attaching position at the first opening 8, a posture changing device which rotates the hinge members 16 (right and left) on the car body side of the bonnet 1 transferred to the posture changing position to the sitting posture (closed posture), a locating device which locates precisely the bonnet 1 transferred to the above attaching position and a fastening device which fastens the hinge member 16 on the car body side of the located bonnet 1 to the car body 6.

An explanation is made below about the above transferring device.

The above transferring device is equipped with a first robot 30 which holds and transfers the bonnet 1 to the first opening 8 at the front part of the car body 6, two CCD cameras 31 which detect standard holes 13a, 13b (refer to FIG. 3) of the bonnet 1 held by the first robot 30 and a control unit 32 having within a CPU which controls the first robot 30 on the basis of output from teaching data set beforehand and the CCD camera 31 and output from CCD cameras 55, 56 (to be described later).

Figure 6:
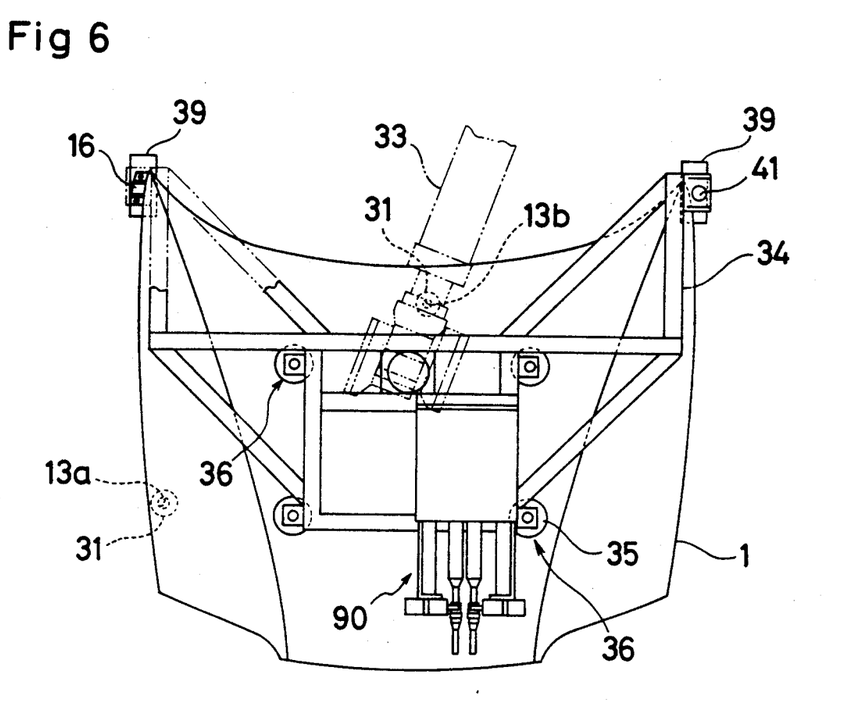
FIG. 6 is a plan view of the bonnet and the frame at a correcting station.
Figure 7:
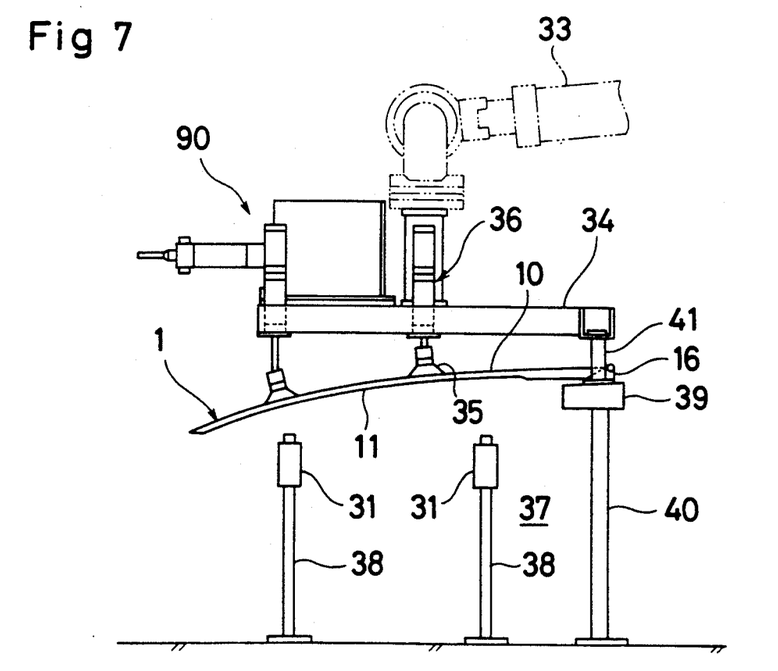
FIG. 7 is a side view of the bonnet and the frame shown in FIG. 6.

The first robot 30 is a multi-joint robot (6 joints) provided leftwardly of the car body 6 to be conveyed. As shown in FIG. 6 and FIG. 7, a frame 34 is provided at a top end portion of a hand 33 of the first robot 30. The frame 34 is equipped with four adsorption devices of vacuum type having adsorption pads 35 for holding the bonnet 1.

The two CCD cameras 31 are of conventional type. Each of the CCD cameras 31 is provided at a top end portion of a pair of props 38 resting on a correcting station 37 in front of the first robot 30, as shown in FIG. 6 and FIG. 7. Image signals including standard holes 13a, 13b fromed at the inner panel 11 are outputted from each camera 31 to the control unit 32.

A pair of receiving plates 39 is provided in the rear of the correcting station 37 through the medium of a prop 40 and the hinge member 16 on the car body side can be rotated to the closed posture by the receiving plate 39. A pair of electromagnets 41 (right and left) for holding the hinge member 16 on the car body side which is in closed posture is provided at the rear end portion of the frame 34 and the bonnet 1 can be transferred to the attaching position of the car body 6, with the hinge member 16 on the car body side held in closed posture. According to this structure, the bonnet 1 can be transferred, with the hinge member 16 on the car body side changed to the closed posture, and therefore there is no fear that the upper surface of the front fender apron 20 in damaged while the bonnet 1 is being transferred.

The control unit 32 is equipped with an image processing device which detects the positions of the standard holes 13a, 13b through image processing of image signals from the CCD camera 31 and the first robot 30 is controlled by control signals from the control unit 32. Under this arrangement, the bonnet 1 conveyed to the attaching station 4 by the hanger 3 is adsorbed and held by the adsorption pad 5, is taken out from the hanger 3, is transferred to the correcting station 37, is put in a closed state at the specified position of the correcting station 37, is held temporarily at the posture changing position on the basis of output from the CCD cameras 31, 55, 56 and teaching data, and then is set at the attaching position of the first opening 8 of the car body 6.

An explanation is made below about the locating device.

The locating device is for locating precisely the bonnet 1 set at the attaching position is relation to the car body 6. It comprises a second robot 51 having a locating pin 50 (refer to FIG. 8) which is put through the standard hole 13a of the bonnet 1, a third robot 53 having a locating head 52 which checks the bonnet 1 from the right side, a fourth robot 54 which passes the bonnet 1 so that the bonnet 1 rotates towards the locating head 52 with the locating pin 50 as the center, two CCD cameras 55, 56 which detect the standard holes 23, 24 formed at the upper wall part of the front fender apron 20, and a control unit 57 having within a CPU which controls the second, the third and the fourth robots 51, 53, 54 on the basis of image signals from teaching data set beforehand and CCD cameras 55, 56.

Figure 8:
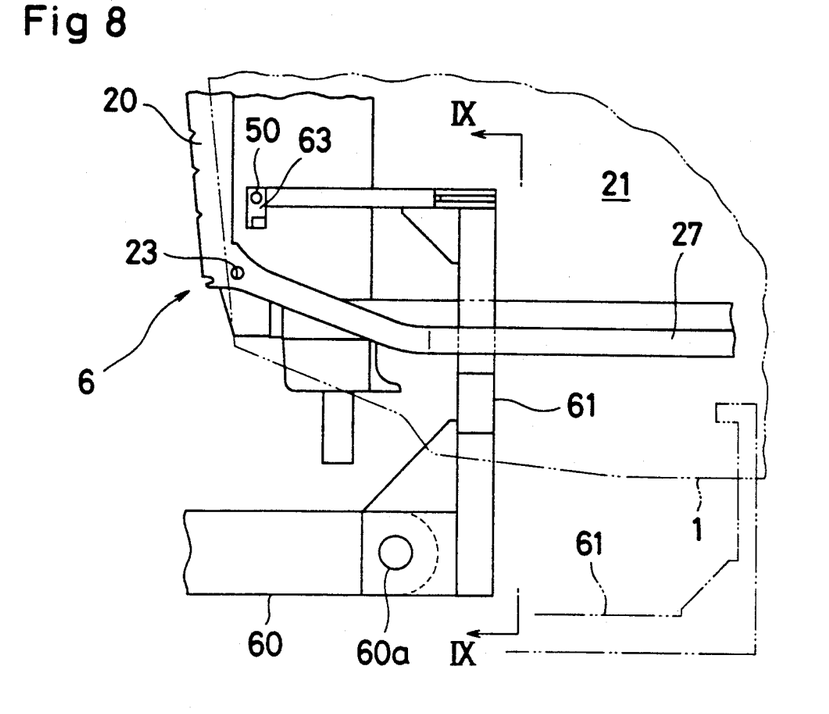
FIG. 8 is a plan view of a revolving arm and a main part of the car body.
Figure 9:
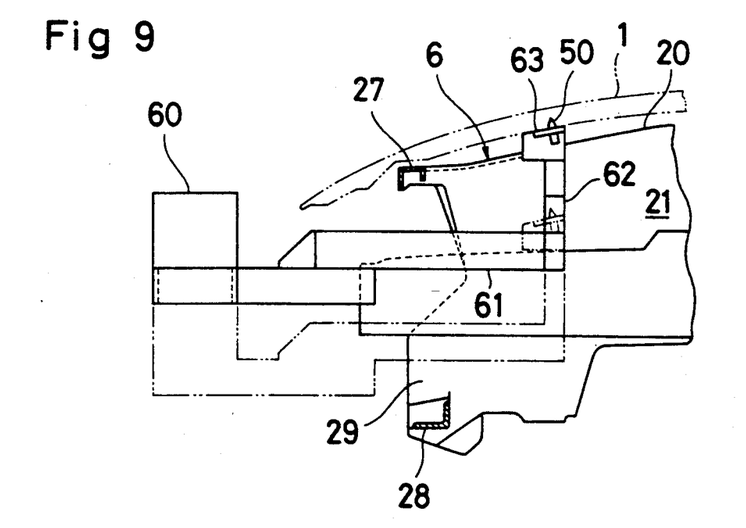
FIG. 9 is a cross section, taken along the IX—IX line in FIG. 8.

The second robot 51 is a multi-joint robot (4 joints) provided at the right side of a front end portion of the located car body 6. As shown in FIG. 8 and FIG. 9, the second robot 51 has at a top end portion of its hand 60 a revolving arm 61 of L-shaped (in plan) which rotates substantially in horizontal direction with an axis of rotation 60a extending in perpendicular direction as the center. A support rod 62 extending upwardly rests on a top end portion of the revolving arm 61. Fixed to a top end portion of the support rod 62 is a support plate 63 with a slanting upper surface for supporting the bonnet 1 from below. The support plate 63 is provide with the locating pin 50 projecting upwardly for locating one point part of the bonnet 1, which is put through the standard hole 13a of the bonnet 1 transferred to the attaching position in relation to the car body 6. With the rotation of the revolving arm 61, the locating pin 50 is inserted in the engine room 21 from a front side opening 29 of the car body 6. By the locating pin 50 being moved upwardly in the state, the locating pin 50 is set at the specified position at the right end front part of the engine room 21 as it is projecting upwardly from the engine room 21 to the specified extent.

Figure 10:
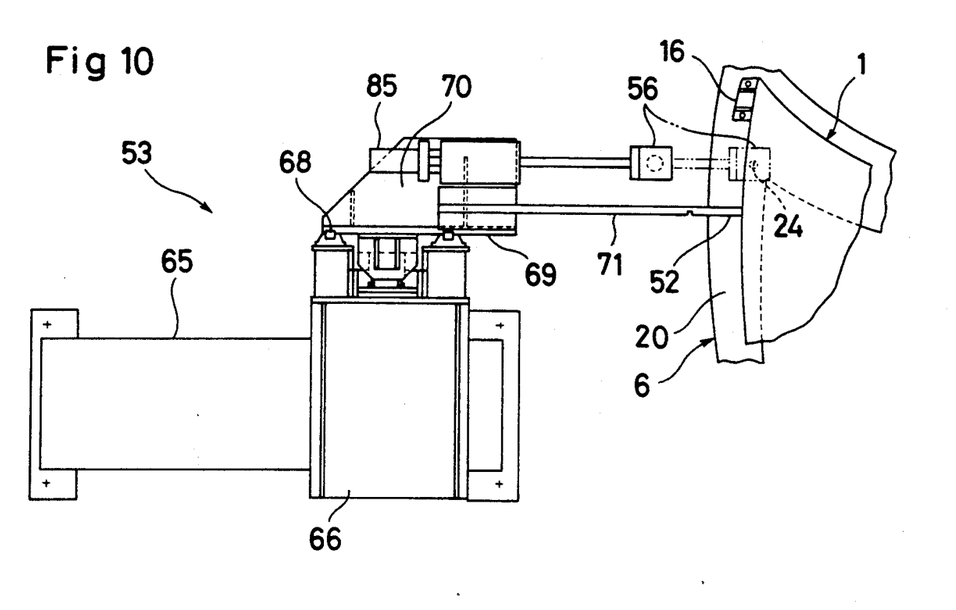
FIG. 10 is a plan view of the third robot and a main part of the car body.
Figure 11:
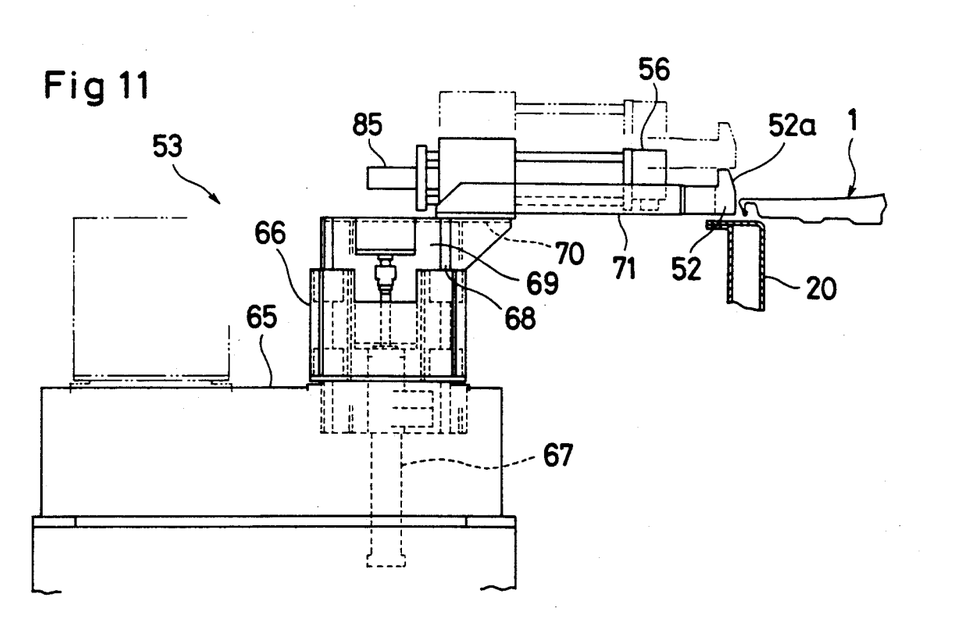
FIG. 11 is a front view of the third robot and a main part of the car body shown in FIG. 10.

The third robot 53 is arranged in the rear of the second robot 51. As shown in FIG. 10 and FIG. 11, a movable base 66 which is moved in right and left directions by a servomotor (not shown in the drawing) is on a base frame 65. Provided at the backside of the movable base 66 is a movable plate 69 which is moved up and down along a guide rail 68 by a cylinder 67. Fixed to the rear end surface of the movable plate 69 is a support member 70 extending rearwardly. Fixed to the front part of the support member 70 is a support plate 71 extending substantially in horizontal direction toward the car body 6. Fixed to the left end portion of the support plate 71 is the locating head 52, having a slant guide surface 52a, which guides the right end portion of the bonnet 1 to the center side of the car width. The locating head 52 is located at the specified position above the back part of the right front fender apron 50 by the servomotor and the cylinder 67 mentioned above.

Figure 12:
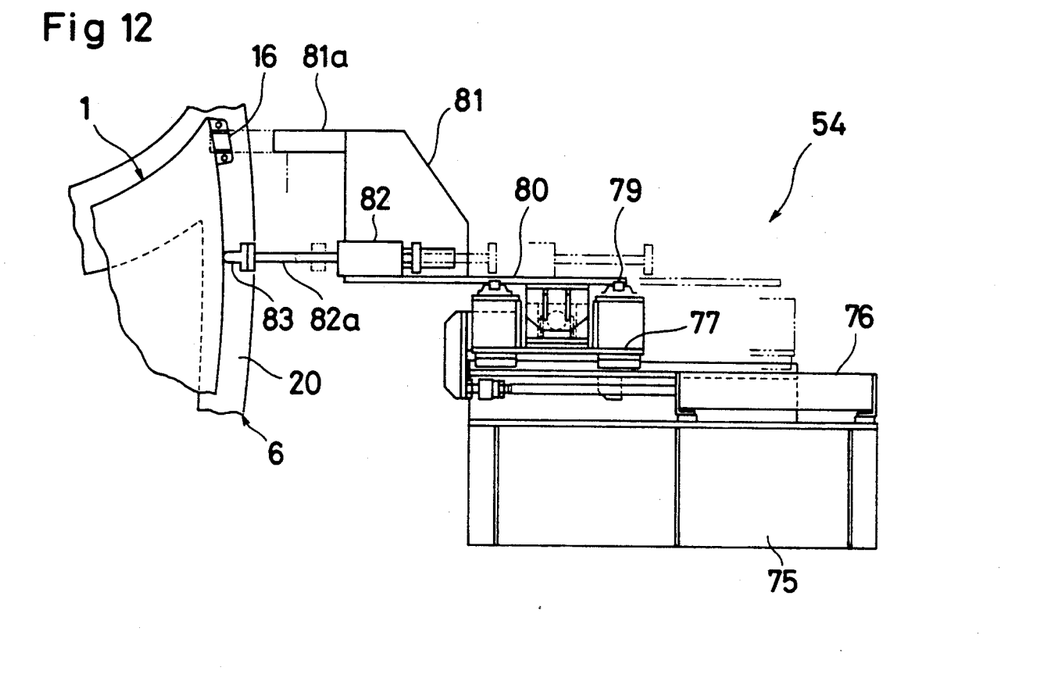
FIG. 12 is a plan view of the fourth robot and a main part of the car body.
Figure 13:
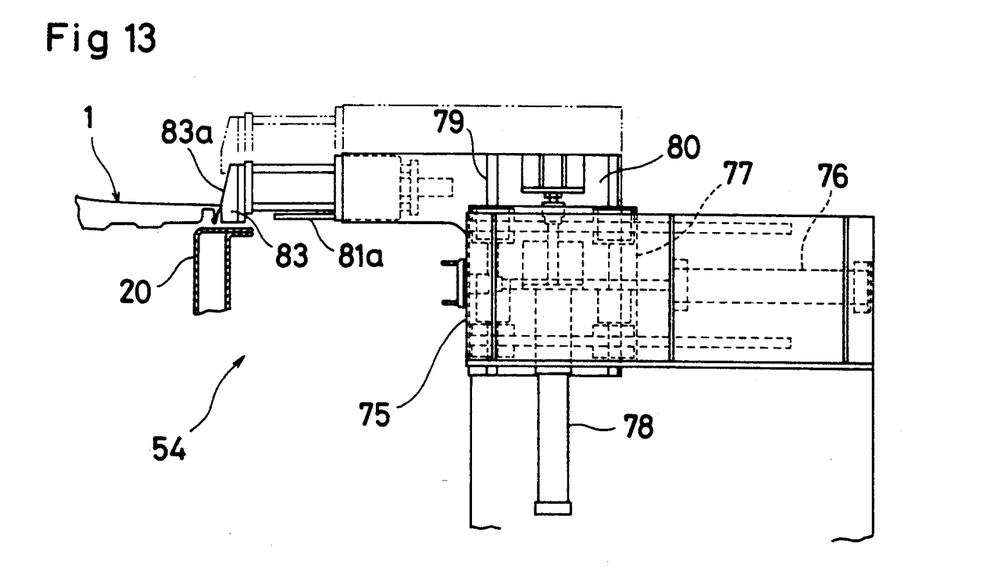
FIG. 13 is a front view of the fourth robot and a main part of the car body shown in FIG. 12.

The fourth robot 54 is arranged leftwardly of the car body 6 and opposite to the third robot 53. As shown in FIG. 12 and FIG. 13, a movable base 77 which is moved in right and left directions by a cylinder 76 is arranged at the backside of a base frame 75. Provided at the backside of the movable base 77 is a movable plate 80 which is moved up and down along a guide rail 79 by a cylinder 78. Fixed to the rear end surface of the movable plate 80 is a support member 81 extending rearwardly and substantially in horizontal direction. Fixed to the front part of the support member 81 is an air cylinder 82 extending substantially in horizontal direction. Fixed to a top end portion of a piston rod 82a of the air cylinder 82 is a pressing head 83. Formed at the upper part of a top end surface of the pressing head 83 is a slant guide surface 83a which guides the left end portion of the bonnet 1 to the center side of the car width. The pressing head 83 is set at the specified position above the front fender apron 20 by driving by the cylinders 76, 78. The position at which the pressing head 83 is set is such that the distance between the pressing head 83 and the locating head 52 is somewhat larger than the width of the bonnet 1.

The CCD cameras 55, 56 are similar to the CCD camera 31 in composition. As shown in FIG. 1 and FIG. 10, the CCD camera 56, is supported movably in right and left directions through the medium of an air cylinder 85 provided at the backside of the support member 70 of the third robot 53 and the CCD camera 55 is supported movably in right and left directions through the medium of an air cylinder 87 at the upper end portion of a support frame 86 resting on a work floor. Both of the CCD cameras 55, 56 output image signals, including standard holes 23, 24 formed at the upper wall part of the front fender apron 20, to the control unit 57.

The control unit 57 is provided with an image processing device which detects the positions of the standard holes 23, 24 by image processing the image signals from the CCD cameras 55, 56. On the basis of teaching data and image signals, the control unit 57 controls the second, the third and the fourth robots 51, 53, 54, whereby the locating pin 50 and the locating head 52 are located precisely in relation to the car body 6, the bonnet 1 transferred to the attaching position is pressed by the pressing head 83 so that the bonnet 1 rotates with the locating pin 50 as the center and the right end portion of the bonnet 1 makes contact with the locating head 52, and thus the bonnet 1 is located precisely to the attaching position of the car body 6 by the locating pin 50 and the locating head 52.

An explanation is made below about the posture changing device.

in the case where the receiving plate 39 is not provided at the correcting station 37 and the electromagnet 41 is not provided at the frame 34 of the first robot 30, the posture changing device changes the hinge members 16 (right and left) on the car body side of the bonnet 1 to the sitting posture.

Figure 18:
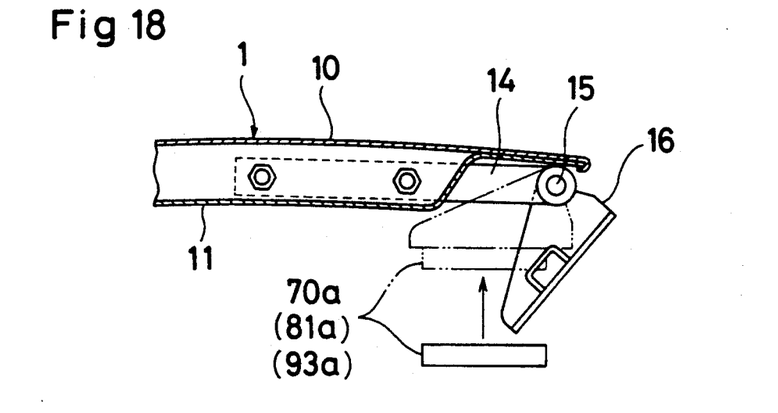
FIG. 18 is a explanatory drawing of the working of a posture changing device.

As shown in FIG. 12 and FIG. 18, a receiving plate 81a extending substantially in horizontal direction toward the car body 6 is fixed to the back part of the support member 81 of the fourth robot 54 and a receiving plate 70a extending substantially in horizontal direction toward the car body 6 is fixed to the back part of the support member 70 of the third robot 53. Each of the receiving plates 81a, 70a is moved by the fourth robot 54 and by the third robot 53 respectively. In this case, before the bonnet 1 is transferred to the posture changing position, the receiving plates 81a, 70a are set at the position corresponding to the hinge member 16 on the car body side of the bonnet 1. When the bonnet 1 is transferred to the posture changing position, it moves upwardly to rotate the hinge member 16 on the car body side to the sitting posture (closed posture) and then moves outwardly, substantially in horizontal direction. It is true that if the connection between the hinge member 16 on the car body side and the pin hinge 15 is rather loose, the hinge member 16 on the car body side rotates to the opened posture again by its own weight but in this case, since the hinge member 16 on the car body side rotates easily, there is no fear that the car body 6 is damaged even if the bonnet 1 is transferred in this state (opened posture).

An explanation is made below about the fastening device.

Figure 14:
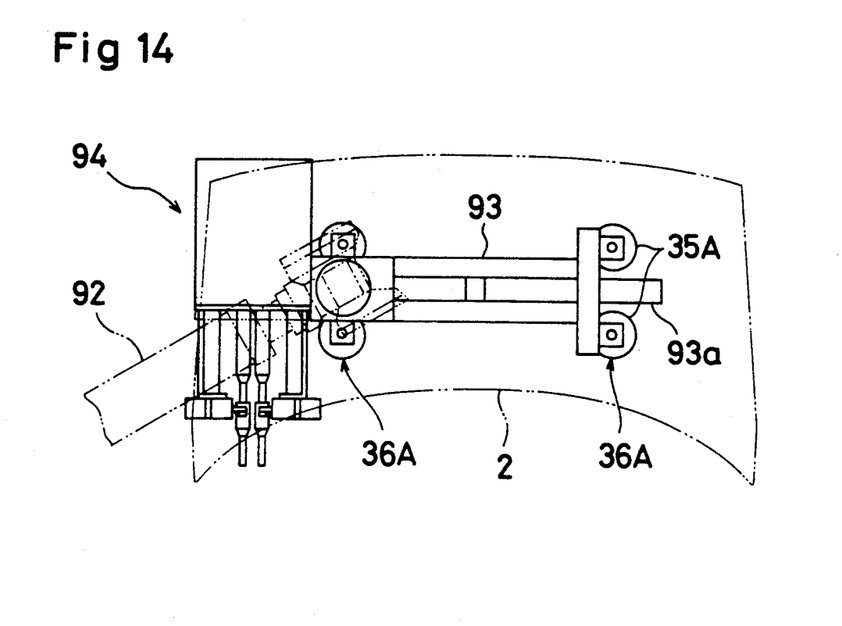
FIG. 14 is a plan view of a trunk lid and a frame.
Figure 15:
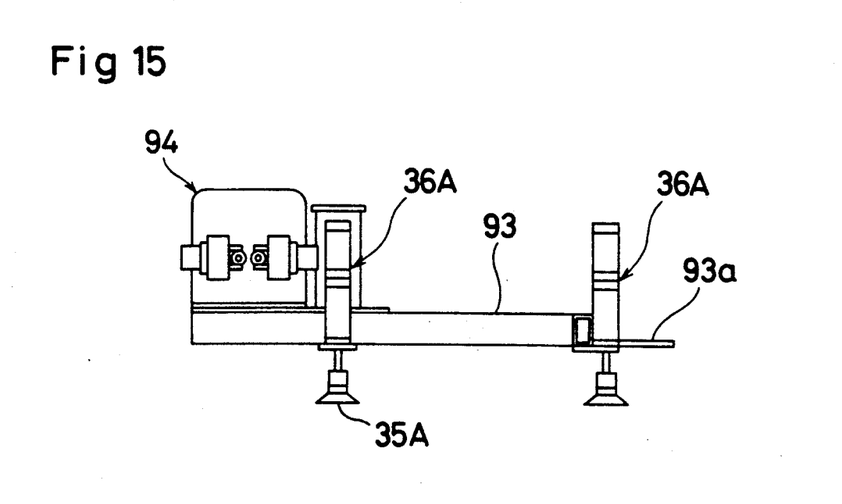
FIG. 15 is a front view of the trunk lid and the frame shown in FIG. 14.

The fastening device is for fastening the hinge member 16 on the car body side of the bonnet 1 located to the attaching position to the car body 6. As shown in FIG. 6 and FIG. 7, a bolt runner 90 is attached to the frame 34 provided at the hand 33 of the first robot 30. As shown in FIG. 1, a fifth robot 91 (6 joints) for transferring the trunk lid 2 is provided at the right side of the attaching station 4. As shown in FIG. 14 and FIG. 15, a frame 93 is provided at a top end portion of a hand 92 of the fifth robot 91 and a bolt runner 94 (similar to the bolt runner 90 in composition) is attached to the frame 93. Similarly to the first robot 30, the fifth robot 91 is controlled by a control unit 95 on the basis of teaching data, etc.

Figure 16:
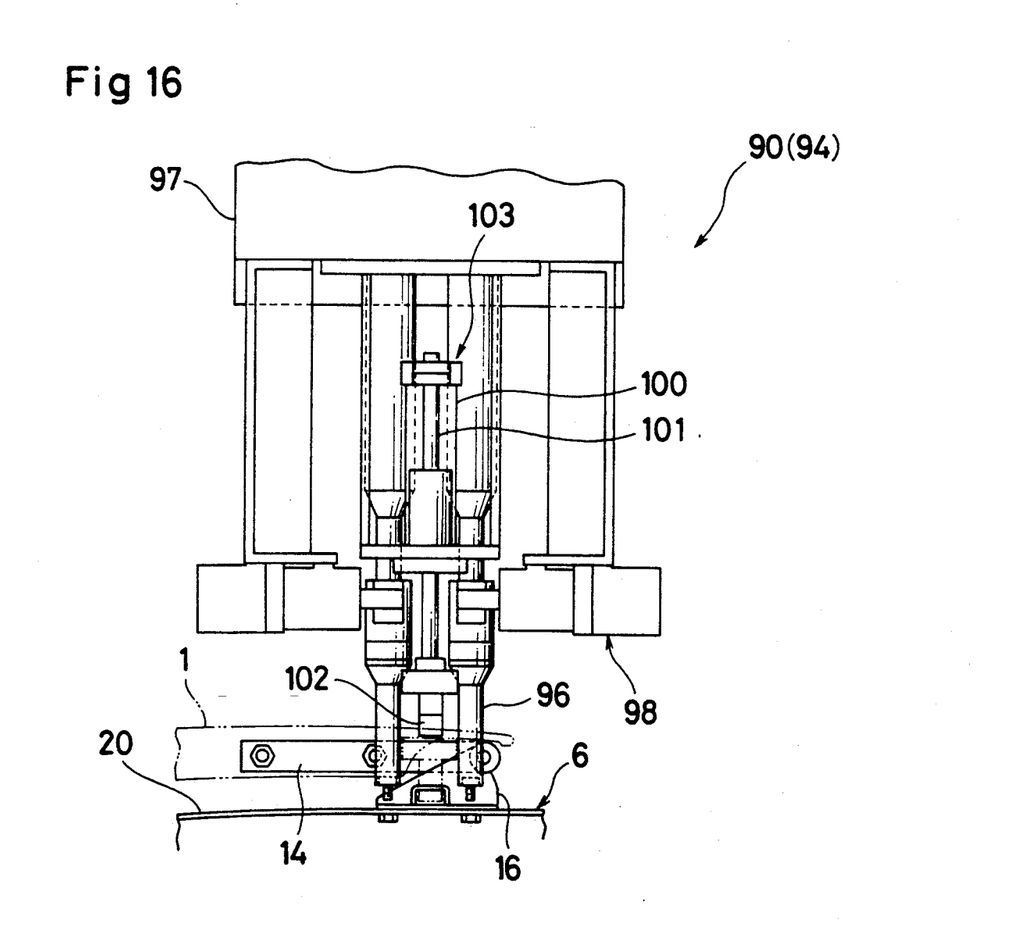
FIG. 16 is a side view of a bolt runner.
Figure 17:
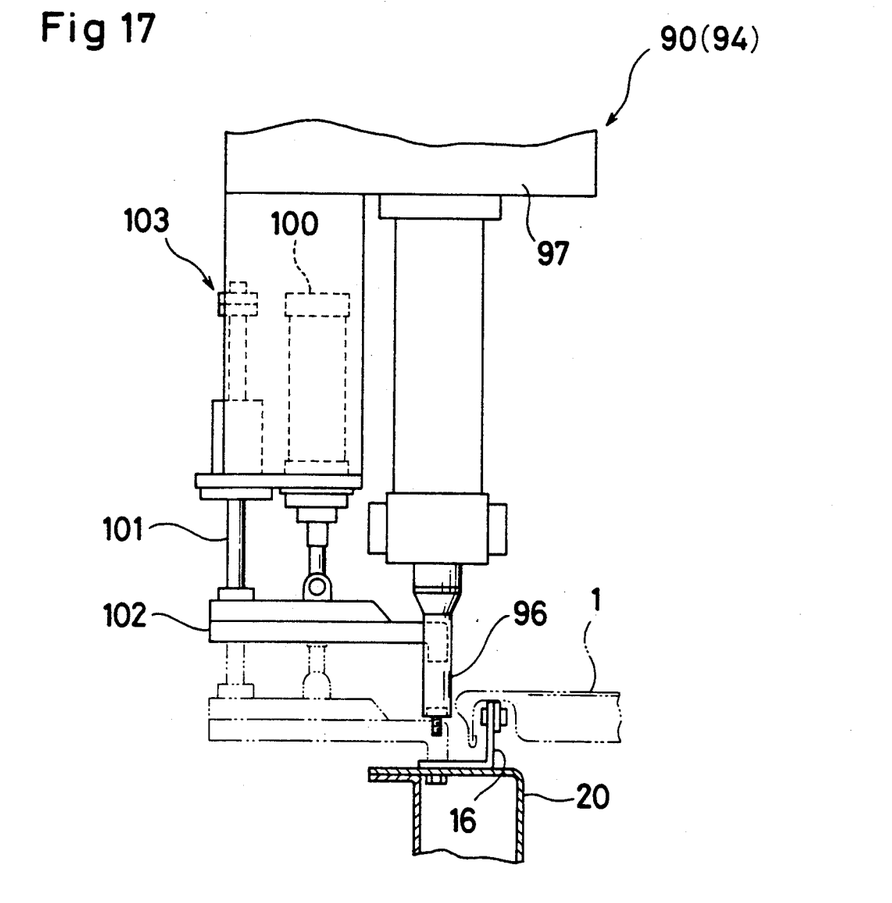
FIG. 17 is a front view of the bolt runner shown in FIG. 16.

As shown in FIG. 16 and FIG. 17, the bolt runners 90, 94 are of conventional construction, namely, are provided with a head part 96 to hold the bolt 18, a driving mechanism 97 to drive the head part 96 for rotation and a locating mechanism to locate the head part 96 to the specified rotation position. The bolt runner 94 is provided further with a pressing mechanism 103 comprising a cylinder 100, a guide rod 101 and a pressing plate 102 for pressing the hinge member 16 on the car body side against the front fender apron 20.

An explanation is made below about the trunk lid transferring device.

The fifth robot 91 of the bonnet attaching device is also used as the trunk lid transferring device. As shown in FIG. 14 and FIG. 15, an adsorption device 63A of vacuum type having four adsorption pads 35A for holding the trunk lid 2 is provided at a frame 93 of the fifth robot 91. The fifth robot 91 is transferred to the specified position (the right part of the attaching station 4) on the basis of control signals from the control unit 95. However, it is feasible to transfer the trunk lid 2 to the attaching position of the second opening 9 by the fifth robot 91.

Figure 19:
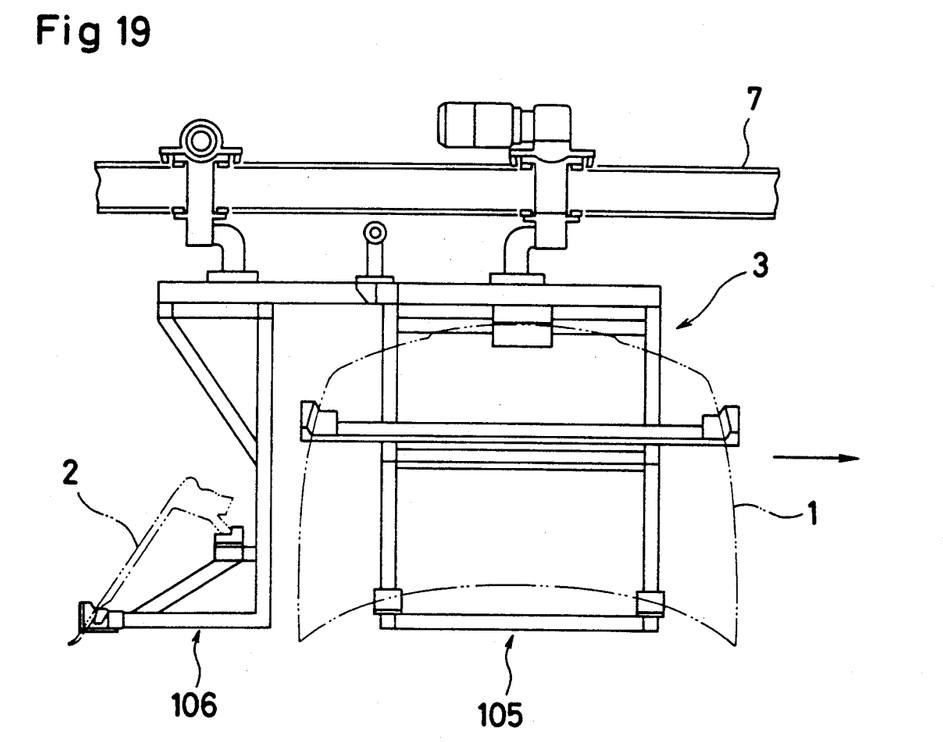
FIG. 19 is a side view of a hanger.
Figure 20:
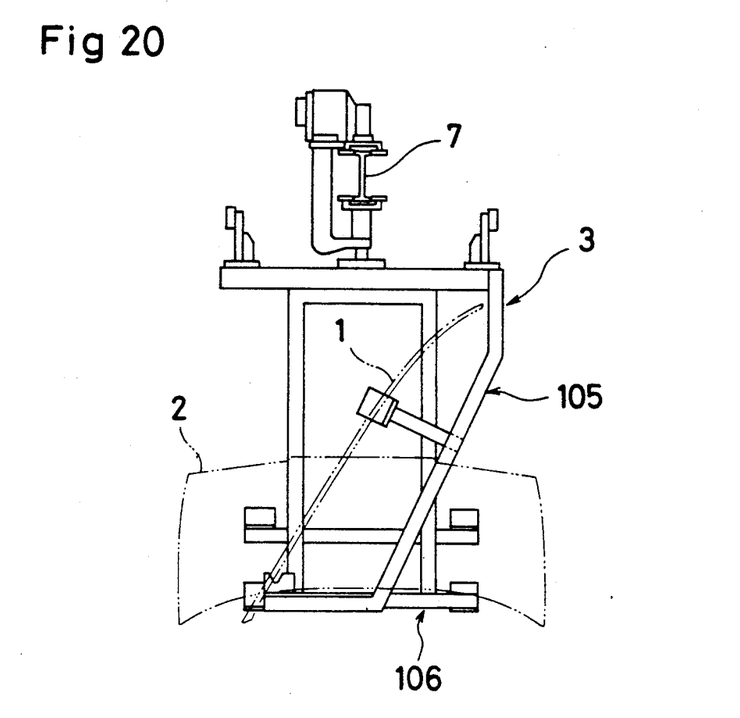
FIG. 20 is a front view of the hanger shown in FIG. 19.

The above transferring device has the conveying rail 7 and the hanger 3 which propels itself along the rail 7. As shown in FIG. 19 and FIG. 20, a bonnet holding frame 105 for holding the bonnet 1 is provided at the front part (conveying direction side) of the hanger 3. The bonnet 1 is held slantly in such a fashion that its car width direction is the direction along the conveying rail 7 and its rear part side declines downwardly. Provided at the back part of the hanger 3 is a trunk lid holding frame 106 for holding the trunk lid 2. The trunk lid 2 is held slantly in such a fashion that its car width direction is the direction perpendicular to the conveying rail 7 and its rear part points upwardly.

An explanation is made below about the method of attaching the bonnet 1 to the car body 6 by the above bonnet attaching device.

when the car body 6 is conveyed by the shuttle conveyor to the specified position of the attaching station 4 and is located, image signals are outputted from the CCD cameras 55, 56 to the control units 32, 57.

On the other hand, when the bonnet 1 and the trunk lid 2 are conveyed by the conveying device to the specified position at the right part of the attaching station 4, firstly the trunk lid 2 is taken out from the hanger 3 by the fifth robot 91 and only the bonnet 1 is conveyed to the specified position at the left part of the attaching station 4 by the transferring device and is taken out from the hanger 3 by the first robot 30.

The trunk lid 2 taken out by the fifth robot 91 is transferred to the assembling station 5 at the left back part of the attaching station 4 and the hinge member (not shown in the drawing) is attach at the assembling station 5.

The bonnet 1 taken out by the first robot 30 is set in a closed state at the specified position of the correcting station 37 as it is held by the first robot 30. After the position of the bonnet 1 held by the adsorption device 36 is detected, the bonnet 1 is transferred to the posture changing position above the first opening 8 on the basis of image signals from teaching data and the CCD cameras 31, 55, 56. At the posture changing position, while the hinge member 16 (left side) on the car body side is rotated to the sitting posture by the receiving plate 81a of the fourth robot 54, the hinge member 16 (right side) on the car body side is rotated to the sitting posture by the receiving plate 70a of the third robot 53 and then the bonnet 1 is transferred, in its closed state, to the attaching position of the first opening 8.

The second, the third and the fourth robots 51, 53, 54 are controlled on the basis of image signals from teaching data and the CCD cameras 55, 56, more particularly, the revolving arm 61 of the second robot 51 is rotated, the rotating pin 50 is inserted from the front side opening 29 of the car body 6 into the engine room 21, the locating pin 50 is located precisely in relation to the car body 6, the locating head 52 of the third robot 53 is located precisely in relation to the car body 6 and the pressing head 83 of the fourth robot 54 is located to the specified position. When the bonnet 1 is transferred to the attaching position by the first robot 30, both end portions (right and left) at the back part of the bonnet 1 are guided in car width direction by the locating head 52 and the guide surfaces 52a, 83a of the pressing head 83, the locating pin 50 is put through the standard hole 13a of the bonnet 1 and one point part of the bonnet 1 is located precisely to the car body 6 by the locating pin 50.

Then, when the bonnet 1 is transferred to the first opening 8 of the car body 6 from the hand 33 of the first robot 30, the air cylinder 82 works and the pressing head 83 presses the bonnet 1 in such a fashion that the bonnet 1 rotates with the locating pin 50 as the center to the side of the locating head 52 and the right end portion of the bonnet 1 is checked by the locating head 52, whereby the front side of the bonnet 1 is located by the locating pin 50 and the rear side of the bonnet 1 is located by the locating head 52. Thus, the bonnet 1 is located precisely in relation to the car body 6.

Then, the hinge members (right and left) on the car body side of the bonnet 1 are fastened to the car body 6 as they are pressed against the front fender apron 20 by the bolt runners 90, 94 provided at the hands 33, 92 of the first, the fifth robots 30, 91. Alternatively, it is feasible to transfer the trunk lid 2 by manual work to the attaching position of the second opening 9 and then to fasten the hinge member of the trunk lid 2 to the car body 6 by the fastening device.

As stated above, since the first robot 30 is imparted with the function of transferring the bonnet 1 and the function of fastening the hinge member 16 (left side) on the car body side and the fifth robot 91 is imparted with the function of transferring the trunk lid 2 and the function of fastening the hinge member 16 (right side) on the car body side, transferring of the bonnet 1 and the trunk lid 2 and fastening of both hinge members 16 on the car body side are made possible by using the first and fifth robots 30, 91 effectively. This proves to be a great advantage to the space for setting up the lid member attaching apparatus and equipment economy. Moreover, the bonnet 1 and the trunk lid 2 can easily be attached to the car body 6 of a different car type only by changing the control data of the control units 32, 95 which control the first robot 30 and the fifth robot 91.

Since the bonnet 1 and the trunk lid 2 for one car body 6 can be conveyed at a time by the conveying device, the mixed-flow production can easily be carried out, with no change made to the conveying device, and handling of the bonnet 1 and the trunk lid 2 by the first and the fifth robots 30, 91 can be done efficiently.

As the bonnet 1 is attached, in its closed state, to the car body 6, the bonnet 1 can be attached to the proper position, without being affected by manufacturing errors of the hinge members 14, 16 (on the bonnet side and the car body side) and attaching errors of the hinge member 14 on the bonnet side in relation to the bonnet 1. Also, clearances between the bonnet 1 and the right-/left front fender panels in a closed state can be made uniform by attaching the right/left front fender panels to the car body 6 after the bonnet 1 was attached. In addition, since the bonnet 1 is located to the car body 6 by the locating pin 50 located in relation to the car body 6 and the locating head 52, precision of attaching the bonnet 1 to the car body 6 is high.

The posture change of the hinge member 16 on the car body side can be carried out by using effectively the third and the fourth robots 53, 54 and fastening of the hinge member 16 on the car body side to the car body 6 can be carried out by using effectively the first and the fifth robots 30, 91. This proves to be a great advantage to equipment economy.

Since the third and the fourth robots 53, 54 are provided with the receiving plates 81a, 70a for changing the posture of the hinge member 16 on the car body side, the hinge member 16 on the car body side can be changed in posture while the locating pin 50 of the second robot 51 and the locating head 52 of the third robot 53 are being located in relation to the car body 6 and therefore working efficiency of the bonnet attaching work can be improved.

As the locating pin 50 is attached to a top end portion of the revolving arm 61 which rotates with the axis of rotation 60a as the center, the locating pin 50 can easily be inserted in the car body by simple action of the resolving arm 61, using effectively the front side opening 29 of the car body 6. Also, the space required for setting the locating pin 50 is a comparatively small space (with the length of the revolving arm 61 as radius), it is not necessary to lengthen the space in longitudinal direction between car bodies 6 being conveyed.

It is feasible to support the CCD camera 56 rotatably in almost horizontal direction toward the car body 6 side, to detect right and left hinge members 16 by the CCD camera 56 and to rotate only the hinge member 16 on the car body side supported in the opened posture to the sitting posture by the receiving plates 81a, 70a.

Is is also feasible to fix the outwardly projecting receiving plate 93a of the frame 93 of the fifth robot 91 and to change the right hinge member 16 on the car body side of the bonnet 1 to the closed posture (refer to FIG. 14 and FIG. 18).

Figure 21:
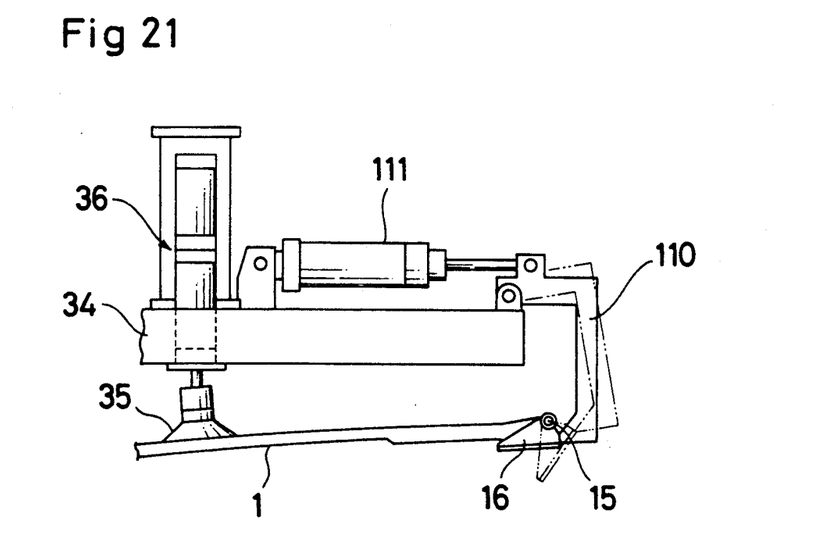
FIG. 21 is a front view of a posture changing device of modified type.

The posture changing device can be the composition as shown in FIG. 21, more particularly, a pair of lever members 110 which can be pressed frontwardly is provided rotatably at a rear end portion of the frame 34 of the first robot 30 and a pair of cylinders 111 which operates to rotate the lever member 110 is provided above the frame 34, whereby when the bonnet 1 is held by the first robot 30 the lever member 110 is rotated so as to change the hinge member 16 on the car body side to the closed posture.

In the case where it is so composed that at least front and rear two points parts of the bonnet 1 are located by the locating head 52, the bonnet 1 can be located precisely to the attaching position, without the second robot 51.

In this embodiment, the present invention is applied to the apparatus of attaching the bonnet of front-open type, but the present invention is applicable to the apparatus of attaching the bonnet of back-open type and also the attaching apparatus which attaches a lid member, such as a trunk lid or the like, to the specified position of the car body 6.

What is claimed is:

1. An apparatus for attaching a lid member of an automobile comprising:
   a lid member transferring means for transferring a lid member to be set in an opening of a car body to said opening of the car body in a closed posture;
   a lid member locating means having a locating member movable toward and away from the car body for locating the lid member at a specified position relative to the car body and locating a one point part of the lid member being transferred by said lid member transferring means in a position so that the lid member is rotatable with said one point part as the center;
   a lid member checking means having a checking member movable toward and away from the car body for checking the specified position relative to the car body and checking other parts of the lid member rotating with said one point part as the center at the specified position;
   a lid member pressing means which presses the lid member so that the lid member rotates with said one point part as the center and said other part of the lid member is checked by said checking member; and
   a lid member attaching means for attaching the lid member positioned at the specified position on the car body by said lid member locating means, said lid member checking means and said lid member pressing means.

2. The apparatus for attaching a lid member of automobile as defined in claim 1 further comprising:

a position detecting means for detecting the position of a specified part of the car body and generating output signals indicative thereof, wherein said lid member locating means has a control means for locating said locating member to the specified position relative to the car body in accordance with the output signals from said position detecting means, and said lid checking means has a control means for locating said checking member to the specified position relative to the car body in accordance with the output signals from said position detecting means.

3. The apparatus for attaching a lid member of automobile as defined in claim 1, wherein said lid member locating means has a revolving arm which has said locating member at a top end portion thereof and is rotatable in a horizontal position, and said locating member is inserted in the car body from an opening provided at a circumference of the car body and is located to the specified position relative to the car body, with the rotation of said revolving arm.

4. The apparatus for attaching a lid member of automobile as defined in claim 1 further comprising:

a position detecting means for detecting the position of a specified part of the car body, and generating output signals indicative thereof, wherein said lid member locating means has a revolving arm which has said locating member at a top end portion thereof and is rotatable in a horizontal position and a control means which rotates said revolving arm in accordance with the signals from said position detecting means so that said locating member is located to the specified position relative to the car body, and said lid member checking means has a control means for locating said checking member to the specified position relative to the car body in accordance with the output signals from said position detecting means.

5. The apparatus for attaching a lid member of an automobile as defined in claim 1, wherein said lid member pressing means includes a first hinge regulating means for positioning a first hinge member of said lid member disposed at said one side of the car body in a posture for attachment to the car body; and said lid member attaching means includes;

a hinge setting means disposed at the other side of the car body including a second hinge regulating means for positioning a second hinge member of said lid member disposed at the opposing side of the car body in a posture for attachment to the car body; and a hinge fastening means for fastening said first and second hinge members to the car body.

6. The apparatus for attaching a lid member as defined in claim 5, wherein said hinge fastening means for fastening said first hinge member is positioned on said lid member transferring means.

7. The apparatus for attaching a lid member as defined in claim 5, wherein said hinge fastening means for fastening said second hinge member is positioned on said hinge setting means.

8. The apparatus for attaching a lid member of an automobile as defined in claim 1, further comprising:

a second lid member transferring means disposed at an opposing side of the car body for transferring a second lid member to be set in a second opening of the car body to said second opening in a closed position;

wherein said lid member transferring means is a first lid member transferring means and includes a first hinge fastening means for fastening a first hinge member of said first lid member disposed at one side of the car body to the car body and said second lid member transferring means includes a second hinge fastening means for fastening a second hinge member of said second lid member at the opposing side of the car body to the car body.

9. The apparatus for attaching a lid member of automobile as defined in claim 8, further comprising a lid member conveying means for conveying said first lid member and said second lid member to be set in the car body to the car body in pairs.

* * * * *